JACOB B. HUNSBERGER.

Improvement in Dust-Conveyors for Thrashing-Machines.

No. 5,069. Reissued Sep. 24, 1872.

Witnesses:

Jas. E. Hutchinson

C. L. Euers

Inventor.

Jacob B. Hunsberger, per Alexander Mason

Attorneys.

AM. PHOTO-LITHOGRAPHIC CO. N.Y. (OSBORNE'S PROCESS.)

UNITED STATES PATENT OFFICE.

JACOB B. HUNSBERGER, OF VINCENT, PENNSYLVANIA.

IMPROVEMENT IN DUST-CONVEYERS FOR THRASHING-MACHINES.

Specification forming part of Letters Patent No. 127,884, dated June 11, 1872; reissue No. 5,069, dated September 24, 1872.

*To all whom it may concern:*

Be it known that I, JACOB B. HUNSBERGER, of Vincent, in the county of Chester and in the State of Pennsylvania, have invented certain new and useful Improvements in Dust-Conveyer for Thrashing-Machines; and do hereby declare that the following is a full, clear, and exact description thereof, reference being had to the accompanying drawing and to the letters of reference marked thereon making a part of this specification.

The nature of my invention consists in the construction of a dust-conveyer for thrashing-machines, as will be hereinafter more fully set forth.

In order to enable others skilled in the art to which my invention appertains to make and use the same, I will now proceed to describe its construction and operation, referring to the annexed drawing, in which—

Figure 1:
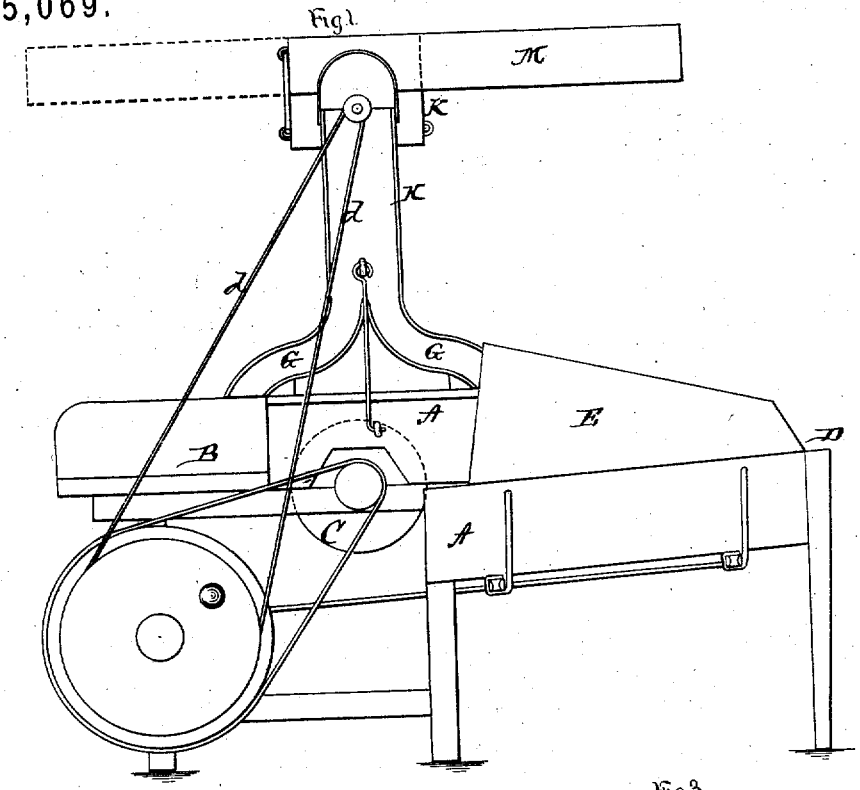
Figure 2:
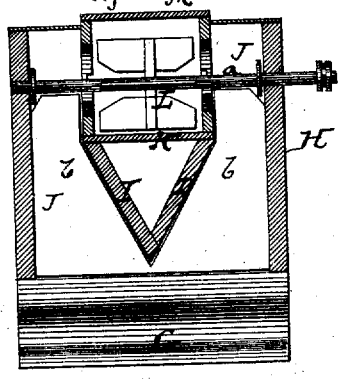
Figure 3:
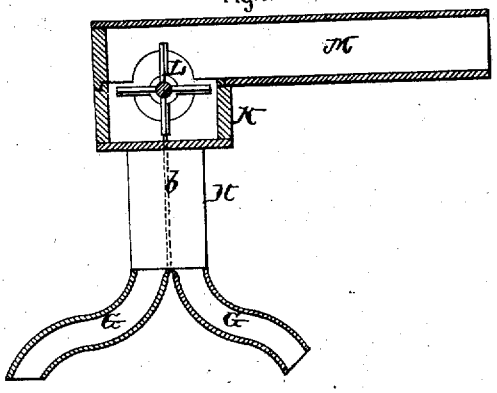

Figure 1 is a side elevation of a thrashing-machine with my dust-conveyer attached thereto; Fig. 2 is a transverse vertical section; and Fig. 3, a longitudinal vertical section of the dust-conveyer.

A represents a thrashing-machine of any desired construction, of which B is the feed-table, C the thrashing-cylinder, and D the tail end. The entire machine in rear of the thrashing-cylinder is covered by an inclined sheet-metal cap, E, so that all dust arising from this part of the machine will be carried toward the center and up the conveyer. The conveyer consists of a box, H, fitted to the thrashing-machine, with one end divided into two flues, G G, the mouths of which fit, one at the inner end of the inclined cap E and the other over the inner end of the feed-table B, or in any other suitable manner, to the machine, so that the dust from either end of the machine will pass through said flues into the box H. I I represent deflecting-boards, which are inclined, as shown in Fig. 2, and are placed either within the flues G G or within the box H, and are for the purpose of dividing the current of air into two parts—one on each side of the fan. K represents a box containing a fan, L, which, by suction, draws the dust up into said box. The fan L is attached to a shaft, *a*, passing horizontally through the end of the conveyer; and from said shaft vertically downward through each of the compartments is a plate, *b*, extending clear down to the point where the flues G G join, thus actually dividing the conveyer and forming continuations of said flues G G, so that the dust from the two ends of the thrashing-machine will not mix or commingle until the currents enter the fan-box K. From this box the dust is blown out through the spout M, which is placed over the box K and fan L, and may be turned in either direction, as shown in Fig. 1, so as to carry the dust out on either side of the barn, as may be desired. When the spout M is reversed the motion of the fan L must also be reversed, which is readily accomplished by twisting the cord or belt *d*, which communicates motion from the driving-shaft of the thrashing-machine to the fan. The spout M, conveyer H, and flues G G may be made of any suitable material, and may be arranged in any suitable position to the machine that will allow their effectual operation. The cap E may be formed of any suitable material, and is for the purpose of collecting the dust in the rear end of the machine, and allowing it to be drawn through the conveyer.

The conveyer may be held to the thrashing-machine and the spout to the conveyer by means of hooks, as shown, or by any other suitable means.

Having thus fully described my invention, what I claim as new, and desire to secure by Letters Patent, is—

1. In combination with the feed and discharge openings of a thrashing-machine, the dusting attachment herein described, consisting of the conveyer H, deflecting-boards I I, plates *b b*, and box K, with fan L and spout M, substantially as and for the purposes herein set forth.

2. In combination with a thrashing-machine, the cap E, conveyer H, with deflecting-boards I I, plates *b b*, box K, fan L, and spout M, to convey the dust outside the barn, all substantially as and for the purposes set forth.

3. The reversible spout M covering the fan L, constructed and arranged substantially as and for the purposes herein set forth.

In testimony that I claim the foregoing I have hereunto set my hand this 6th day of September, 1872.

JACOB B. HUNSBERGER.

Witnesses:

J. M. MASON,

C. L. EVERT.